US009934446B2

(12) United States Patent
Yano et al.

(10) Patent No.: US 9,934,446 B2
(45) Date of Patent: Apr. 3, 2018

(54) OBJECT DETECTING APPARATUS AND METHOD

(71) Applicant: CANON KABUSHIKI KAISHA, Tokyo (JP)

(72) Inventors: Kotaro Yano, Tokyo (JP); Ichiro Umeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 14/533,394

(22) Filed: Nov. 5, 2014

(65) Prior Publication Data
US 2015/0138386 A1 May 21, 2015

(30) Foreign Application Priority Data

Nov. 20, 2013 (JP) ................................. 2013-240175

(51) Int. Cl.
| | | |
|---|---|---|
| G06K 9/00 | (2006.01) | |
| G06K 9/32 | (2006.01) | |
| H04N 5/232 | (2006.01) | |
| G06K 9/46 | (2006.01) | |
| G06K 9/62 | (2006.01) | |

(52) U.S. Cl.
CPC ......... *G06K 9/3241* (2013.01); *G06K 9/4642* (2013.01); *G06K 9/4671* (2013.01); *H04N 5/23229* (2013.01); *G06K 9/6256* (2013.01)

(58) Field of Classification Search
CPC . G06K 9/4642; G06K 9/4671; H04N 5/23229
See application file for complete search history.

(56) References Cited

U.S. PATENT DOCUMENTS

| | | | | |
|---|---|---|---|---|
| 7,194,453 B2 * | 3/2007 | Yamamoto | ........ | G06F 17/30247 |
| 7,699,423 B2 * | 4/2010 | Suwa | ...................... | B41J 2/2132 347/14 |
| 8,355,569 B2 | 1/2013 | Takahashi | | |
| 8,462,211 B2 * | 6/2013 | Lopota | .................. | G06T 7/2006 348/149 |
| 8,634,656 B2 | 1/2014 | Yano | | |
| 8,787,629 B2 * | 7/2014 | Kaneda | .............. | G06K 9/00604 382/103 |
| 8,923,554 B2 * | 12/2014 | Yano | ..................... | G06K 9/3233 382/103 |
| 8,929,595 B2 * | 1/2015 | Suzuki | ............... | G06K 9/00281 382/103 |
| 9,036,863 B2 | 5/2015 | Yano | | |
| 9,317,784 B2 * | 4/2016 | Yano | ...................... | G06T 7/0081 |
| 2002/0080425 A1 * | 6/2002 | Itokawa | ............... | G06K 9/6207 358/496 |
| 2003/0099376 A1 * | 5/2003 | Kim | ........................ | G06K 9/32 382/103 |
| 2005/0280657 A1 * | 12/2005 | Hori | ...................... | G06T 7/2033 345/619 |
| 2009/0267893 A1 * | 10/2009 | Kato | ................... | G06F 3/03547 345/156 |
| 2009/0304271 A1 * | 12/2009 | Takahashi | ................. | G06T 7/11 382/165 |
| 2009/0324075 A1 * | 12/2009 | Shiiyama | ............. | G06K 9/4647 382/170 |
| 2011/0091113 A1 * | 4/2011 | Ito | ....................... | G06K 9/00248 382/197 |
| 2012/0092495 A1 * | 4/2012 | Yano | .................. | G06K 9/00771 348/143 |
| 2012/0288152 A1 * | 11/2012 | Yano | ..................... | G06K 9/6262 382/103 |
| 2013/0064425 A1 * | 3/2013 | Sagawa | .............. | G06K 9/00221 382/103 |
| 2013/0071016 A1 * | 3/2013 | Omer | ....................... | G06T 5/008 382/164 |
| 2013/0142401 A1 * | 6/2013 | Nomoto | ............... | G06K 9/6267 382/118 |
| 2013/0142426 A1 * | 6/2013 | Kaneda | ................ | G06K 9/4642 382/165 |
| 2014/0056518 A1 * | 2/2014 | Yano | ..................... | G06K 9/6267 382/173 |
| 2014/0119656 A1 * | 5/2014 | Lilje | ...................... | G06T 7/0083 382/173 |

(Continued)

FOREIGN PATENT DOCUMENTS

| | | |
|---|---|---|
| JP | 2011-86261 A | 4/2011 |
| JP | 2011-100459 A | 5/2011 |

(Continued)

OTHER PUBLICATIONS

L. Bertelli et al., "Kernelized Structural SVM Learning for Supervised Object Segmentation", Proceedings of the IEEE Conference on Computer Vision and Pattern Recognition, 2011.
R. Achanta et al., "SLIC Superpixels", EPFL Technical Report 149300, Jun. 2010.
P. Felzenszwalb et al., "Efficient graph-based image segmentation", International Journal of Computer Vision, 2004.
N. Dalal et al., "Histograms of Oriented Gradients for Human Detection", Proceedings of the IEEE Conference on Computer Vision and Pattern Recognition, 2005.
D. Tax et al.,"Support Vector Data Description", Machine Learning, 54(1):45-66, 2004.

(Continued)

*Primary Examiner* — Gandhi Thirugnanam
(74) *Attorney, Agent, or Firm* — Fitzpatrick, Cella, Harper & Scinto

(57) ABSTRACT

An image processing apparatus acquires an image including an object and divides the image into a plurality of superpixels based on similarity of adjacent pixels. There is an acquisition, from the superpixels, of a plurality of candidate areas acting as candidates of an area of the object. A feature quantity is extracted from each of the plurality of candidate areas and checked against registered information concerning a feature quantity of object area. The area of the object in the image is output, based on a checked result.

8 Claims, 9 Drawing Sheets

(56) References Cited

U.S. PATENT DOCUMENTS

| | | | |
|---|---|---|---|
| 2014/0294239 A1* | 10/2014 | Duckett | G06K 9/6228 382/103 |
| 2015/0138386 A1* | 5/2015 | Yano | G06K 9/4642 348/222.1 |
| 2015/0139546 A1* | 5/2015 | Sagawa | G06T 7/0095 382/173 |
| 2015/0146924 A1* | 5/2015 | Kihara | G06K 9/00624 382/103 |
| 2015/0154471 A1* | 6/2015 | Ruan | G06K 9/3233 382/190 |
| 2015/0187070 A1* | 7/2015 | Cheng | G06K 9/4633 382/128 |
| 2015/0234863 A1* | 8/2015 | Lilje | G06F 17/30259 382/103 |
| 2015/0254514 A1* | 9/2015 | Oami | G06K 9/00771 707/722 |
| 2015/0356741 A1* | 12/2015 | Osa | G06T 7/0081 382/180 |

FOREIGN PATENT DOCUMENTS

| | | |
|---|---|---|
| JP | 2012-238119 A | 12/2012 |
| JP | 2013-114596 A | 6/2013 |
| WO | 2008/018398 A1 | 2/2008 |

OTHER PUBLICATIONS

D. G. Lowe, "Distinctive image features from scale-invariant key points", Proc. of Int. Journal of Computer Vision, 2004.

U.S. Appl. No. 14/529,676, filed Oct. 31, 2014. Applicant: Yano, et al.

Japanese Office Action dated Oct. 24, 2017 corresponding to Japanese Application No. 2013240175.

* cited by examiner

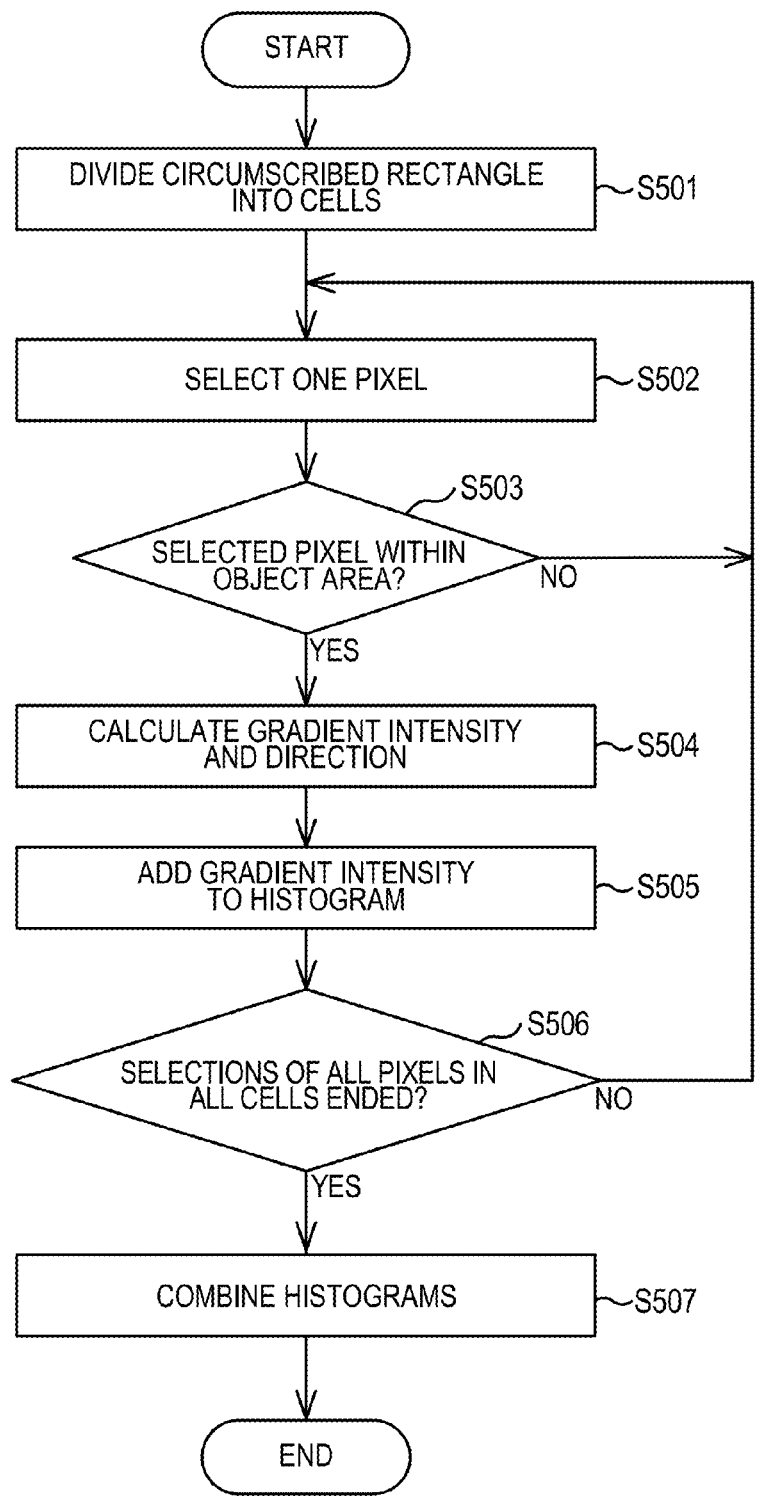

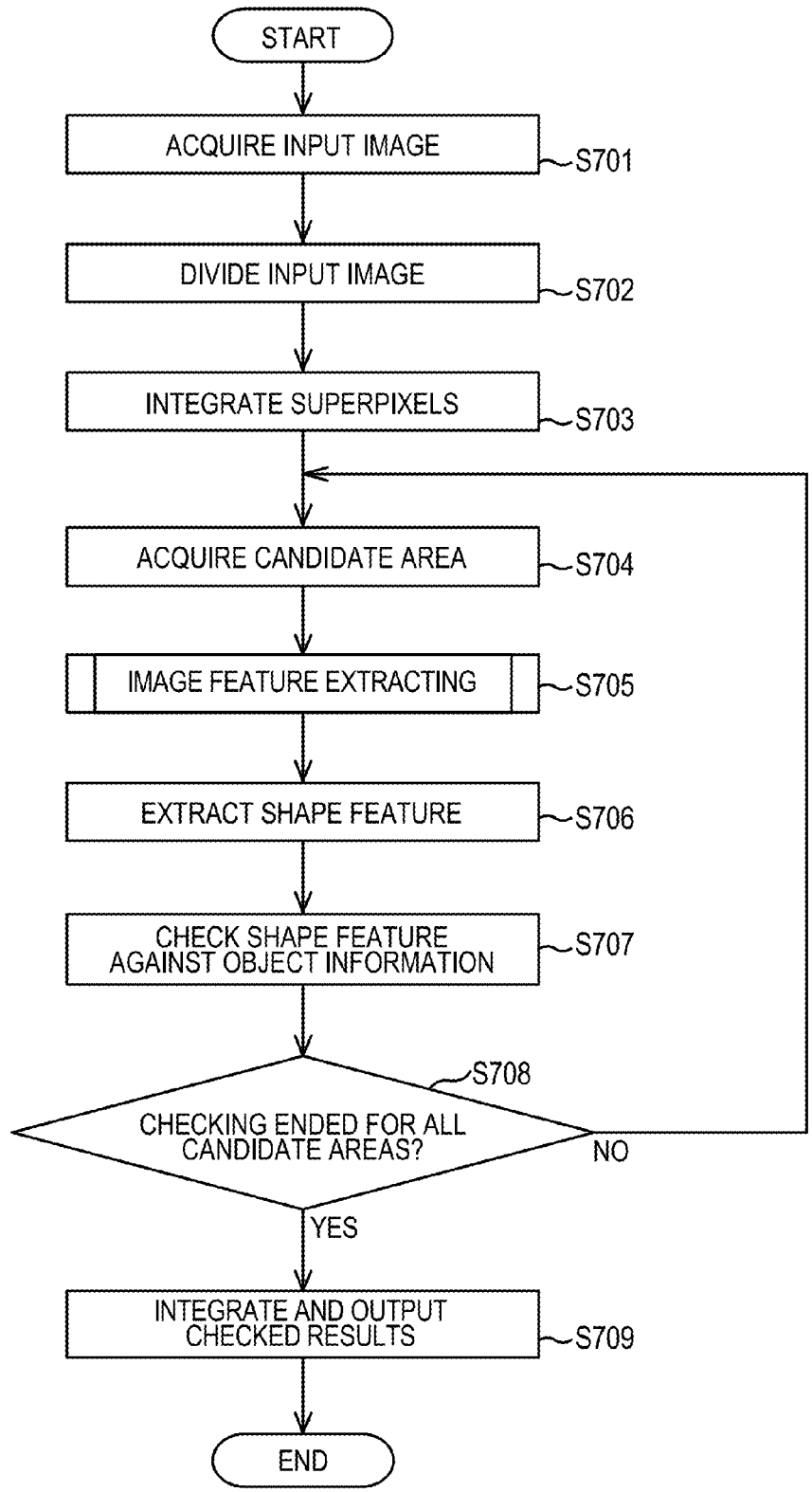

OBJECT DETECTING APPARATUS AND METHOD

BACKGROUND OF THE INVENTION

Field of the Invention

The present invention relates to an apparatus and a method for detecting an object from an image.

Description of the Related Art

Conventionally, in a digital still camera, a camcorder and the like, a function to detect a human face from an image during imaging is known. Such a face detecting function is highly useful for automatically bringing the human face into focus and adjusting exposure of the human face. Here, the face detecting function is achieved by checking numerous detecting windows extracted from an input image against dictionary data previously obtained by learning using a huge number of face images.

In recent years, two functional expansions are expected for the face detection function of this kind. One is to detect not only the human face but also a pet such as a dog, a cat or the like, and the other is to cut out an area of the face (or another object) detected using the face detecting function from the imaged image.

As for the former functional expansion, a method of, in an image obtained by imaging an object being a detection target, previously registering an image in each detecting window including the relevant object or a feature quantity of the image in a dictionary as object image information, and then detecting the object from an input image by referring to the dictionary is disclosed in, e.g., Japanese Patent Application Laid-Open No. 2011-86261. Besides, as for the latter functional expansion, a method of previously learning a mask representing an object region of a specific object (hereinafter, called mask data) together with image data thereof and automatically cutting out the object area is disclosed in Luca Bertelli, Tianli Yu, Diem Vu, and Burak Gokturk "Kernelized Structural SVM Learning for Supervised Object Segmentation", Proceedings of the IEEE Conference on Computer Vision and Pattern Recognition, 2011 (hereinafter, called the literature 1).

Here, there are various shapes of the detection targets. Consequently, if the method of detecting the detection target by using the conventional rectangular detecting window is used, the percentage of background areas in the detecting window becomes large depending on the shape of the detection target. For this reason, if the method disclosed in Japanese Patent Application Laid-Open No. 2011-86261 is simply applied, there is a case where recognition accuracy deteriorates due to the influence of background images. On the contrary, in the method disclosed in the literature 1, since the mask representing the object region is used, it is necessary to previously learn the specific object by using the image data and the mask data of the relevant object. For this reason, it is impossible to cut out the object area for the object which is designated upon at the time of registration.

The present invention has been completed in consideration of such problems as described above, and an object thereof is to accurately detect the registered object from the input image and cut out the object area thereof.

SUMMARY OF THE INVENTION

According to the present invention, an image processing apparatus is characterized by comprising: an image acquiring unit configured to acquire an image including an object; a dividing unit configured to divide the image, which is acquired by the image acquiring unit, into a plurality of superpixels based on similarity of adjacent pixels; a candidate area acquiring unit configured to acquire, from the superpixels divided by the dividing unit, a plurality of candidate areas acting as candidates of an area of the object; an extracting unit configured to extract a feature quantity from each of the plurality of candidate areas acquired by the candidate area acquiring unit; a checking unit configured to check the feature quantity, which is extracted from each candidate area by the extracting unit, against registered information concerning a feature quantity of object area; and an outputting unit configured to output the area of the object in the image, based on a checked result by the checking unit.

Further features of the present invention will become apparent from the following description of exemplary embodiments with reference to the attached drawings.

BRIEF DESCRIPTION OF THE DRAWINGS

FIG. 5 is a flow chart indicating an example of a detailed processing procedure for extracting an image feature.

FIG. 7 is a flow chart indicating an example of a checking procedure.

DESCRIPTION OF THE EMBODIMENTS

Preferred embodiments of the present invention will now be described in detail in accordance with the accompanying drawings.

Figure 9:
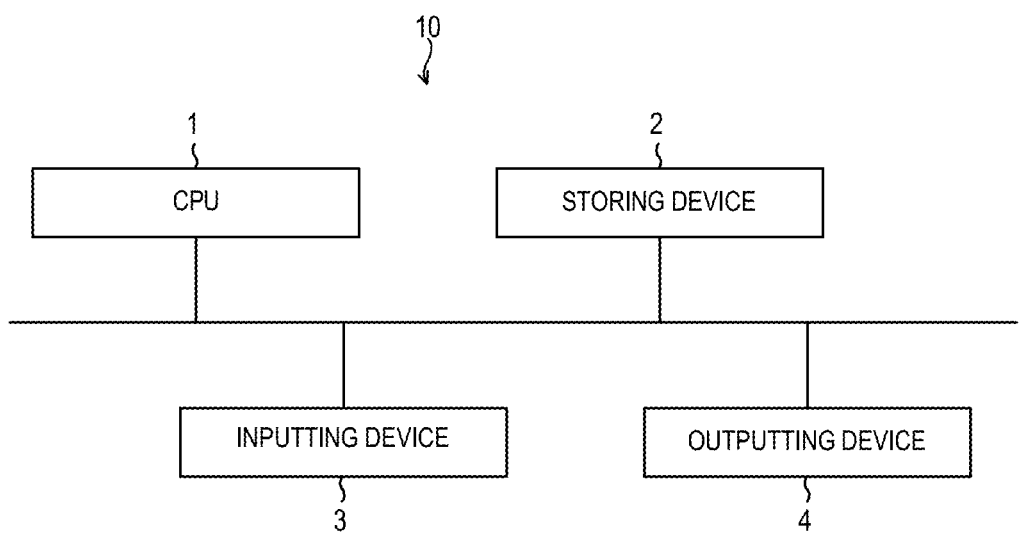
FIG. 9 is a block diagram illustrating a hardware constitutional example of the image processing apparatus according to the embodiment.

FIG. 9 is a block diagram illustrating a hardware constitutional example of an image processing apparatus 10 according to one embodiment.

In FIG. 9, the image processing apparatus 10 comprises a CPU (central processing unit) 1, a storing device 2, an inputting device 3 and an outputting device 4. Incidentally, it should be noted that the respective devices are communicably connected with others through a bus or the like.

The CPU 1 controls various operations of the image processing apparatus 10, and executes various programs stored in the storing device 2. The storing device 2, which is a storage device such as a magnetic storing device, a semiconductor memory or the like, stores therein the programs read based on the operations of the CPU 1, data to be memorized for a long time, and the like. In the present embodiment, the CPU 1 performs processes according to the procedures of the programs stored in the storing device 2, thereby achieving various functions in the image processing apparatus 10 and various processes in later-described flow charts.

The inputting device 3, which is equipped with a mouse, a keyboard, a touch panel device, buttons and the like, inputs various instructions. Further, the inputting device 3 is equipped with an imaging device having an imaging element such as a CCD (charge coupled device), a CMOS (complementary metal oxide semiconductor) or the like, thereby inputting an image to be processed. The outputting device 4, which is a liquid crystal panel, an external monitor or the like, outputs various kinds of information. Incidentally, the hardware constitution of the image processing apparatus 10 is not limited to that described above. For example, the image processing apparatus 10 may comprise an I/O (input/output) device for performing communication with various devices, and thus input and output information such as an image or the like. In this case, the I/O device is equivalent to an inputting/outputting unit for a memory card, a USB (universal serial bus) cable or the like, a wire transmitting/receiving unit, or a wireless transmitting/receiving unit.

Figure 1:
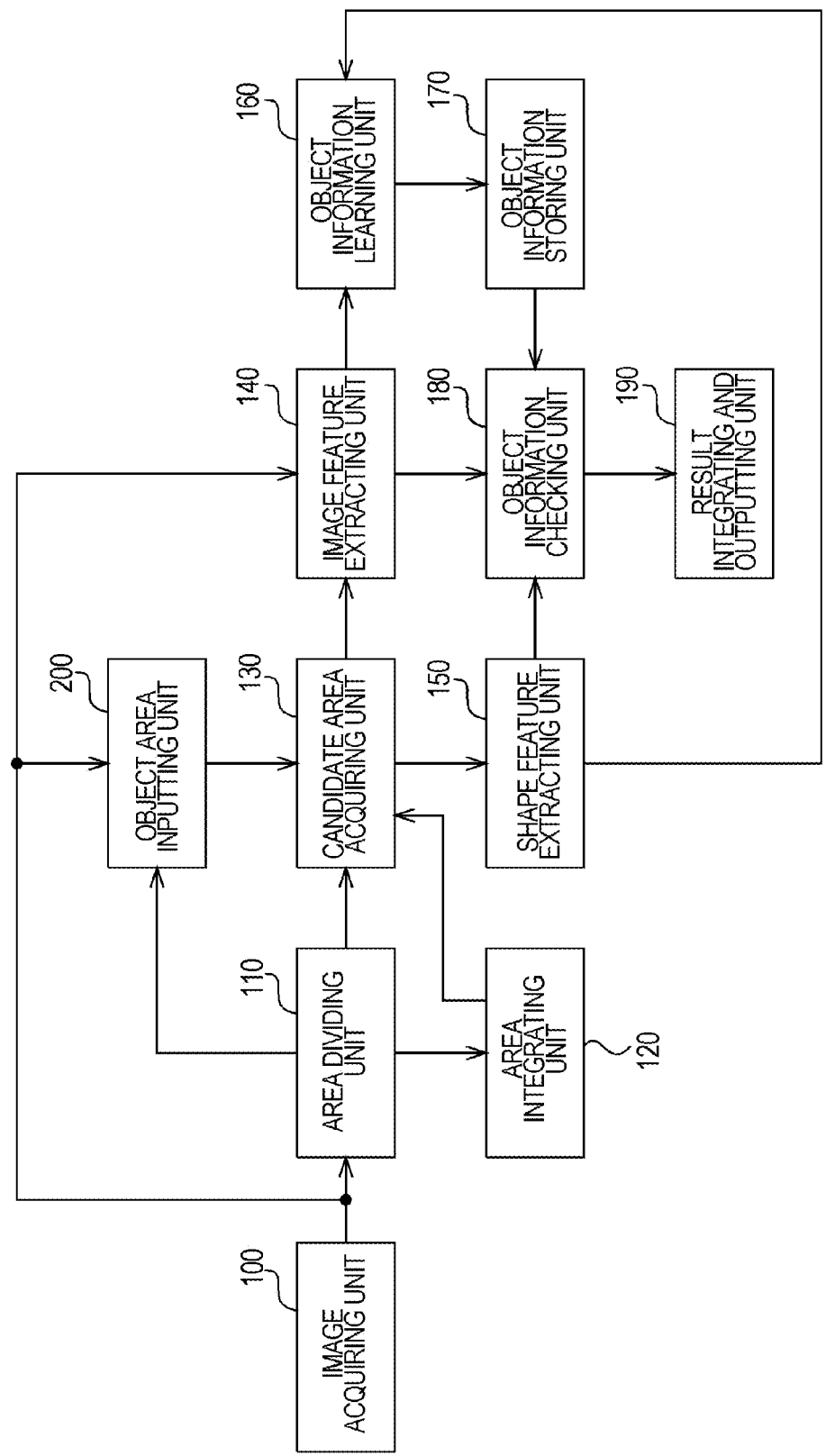
FIG. 1 is a block diagram illustrating a constitutional example of functions included in an image processing apparatus according to an embodiment of the present invention.

FIG. 1 is a block diagram illustrating a constitutional example of the functions included in the image processing apparatus 10 according to the present embodiment. In the present embodiment, the processes and the functions of the image processing apparatus 10 are achieved by the respective units illustrated in FIG. 1. In FIG. 1, an image acquiring unit 100 acquires image data generated by the imaging device such as a camera or the like, an area dividing unit 110 divides (or segments) the image data acquired by the image acquiring unit 100 into a plurality of superpixels (i.e., small areas) composed of adjacent similar pixels, and an area integrating unit 120 integrates the plurality of adjacent superpixels obtained by the area dividing unit 110.

A candidate area acquiring unit 130 acquires an area used as a candidate (i.e., a candidate area) of an object area from the superpixels obtained by the area dividing unit 110 or the area integrated by the area integrating unit 120. Moreover, the candidate area acquiring unit 130 acquires, as the candidate area, an object area input by a later-described object area inputting unit 200. An image feature extracting unit 140 extracts a feature quantity (hereinafter, called an image feature) for recognizing the object concerning the image data from the candidate area acquired by the candidate area acquiring unit 130. A shape feature extracting unit 150 extracts a feature quantity (hereinafter, called a shape feature) for recognizing the object concerning mask data of the candidate area acquired by the candidate area acquiring unit 130.

An object information learning unit 160 learns object information by using the image feature extracted by the image feature extracting unit 140 and the shape feature extracted by the shape feature extracting unit 150. An object information storing unit 170 is a memory in which the object information learned by the object information learning unit 160 is stored. An object information checking unit 180 checks (or collates) the image feature extracted by the image feature extracting unit 140 and the shape feature extracted by the shape feature extracting unit 150 against (or with) the object information stored in the object information storing unit 170.

A result integrating and outputting unit 190 integrates and outputs the plurality of results checked by the object information checking unit 180. For example, the candidate area discriminated as the object area of a recognition target by the object information checking unit 180 is displayed on the outputting device 4 such that the displayed candidate area is distinguishable from other areas. The object area inputting unit 200 inputs, through the inputting device 3, the object area of the registration image acquired by the image acquiring unit 100.

Hereinafter, the operation to be performed in the present embodiment will be described. Initially, a flow of the process of registering the recognition target will be described with reference to a flow chart illustrated in FIG. 2. In the present embodiment, the detection target is registered by using a series of moving images.

Figure 2:
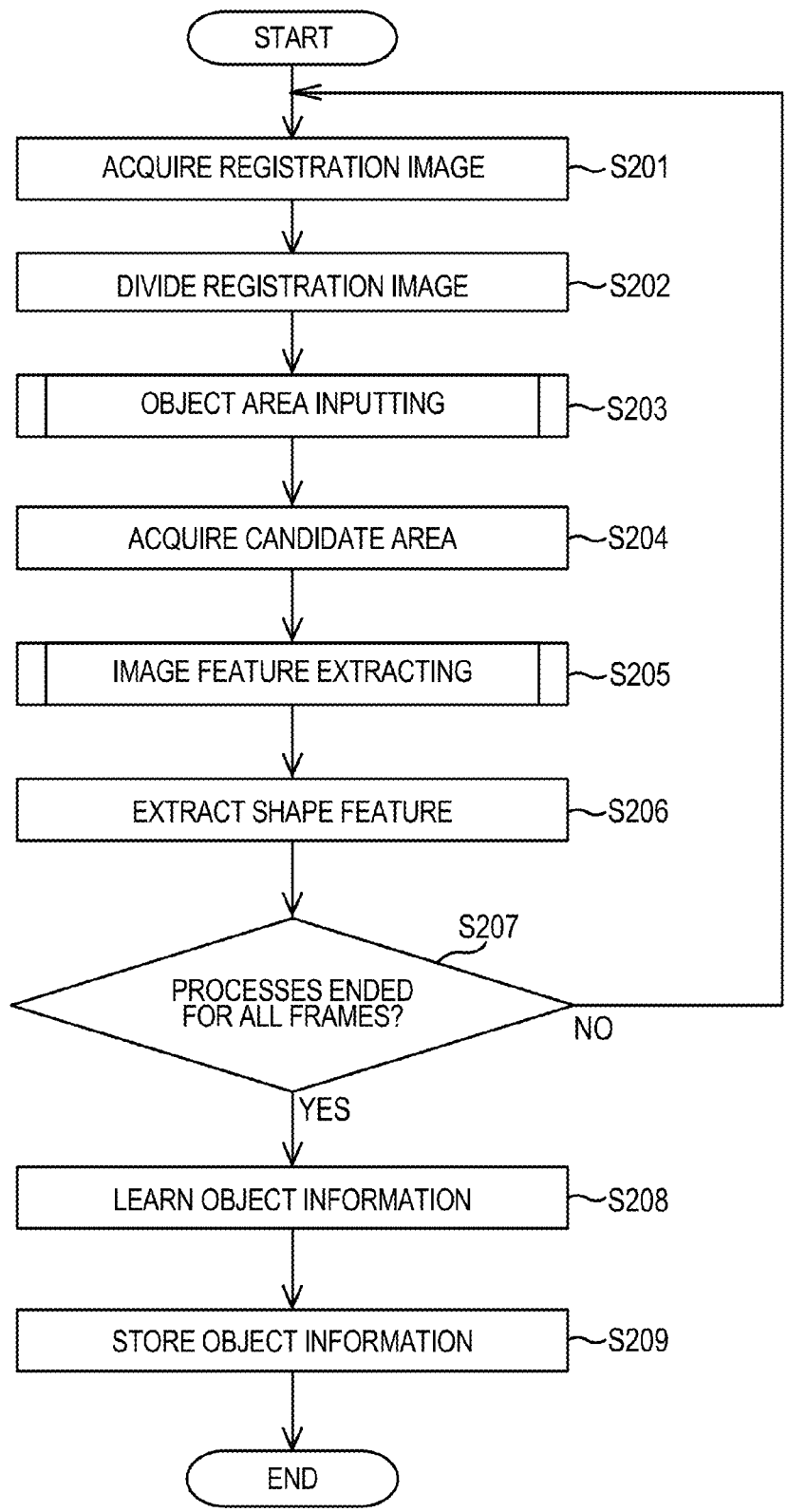
FIG. 2 is a flow chart indicating an example of a registering procedure of a recognition target.

FIG. 2 is the flow chart indicating an example of the registering procedure of the recognition target to be performed by the image processing apparatus 10 according to the present embodiment.

Initially, the image acquiring unit 100 acquires, as the registration image, the image data of one frame from the moving image obtained by imaging the recognition target with the imaging device such as the camera or the like (S201). Here, the image data to be acquired is color image data composed of three (RGB) color components. Further, in the present embodiment, the acquired RGB data is converted into luminance data, and thus obtained luminance image data is applied to subsequent processes.

Next, the area dividing unit 110 divides the registration image acquired by the image acquiring unit 100 into the plurality of superpixels composed of the adjacent similar pixels (S202). Here, as the method of dividing the registration image into the superpixels, for example, a known method using clustering or graphic representation is used (see Radhakrishna Achanta, Appu Shaji, Kevin Smith, Aurelien Lucchi, Pascal Fua, and Sabine Susstrunk, "SLIC Superpixels", EPFL Technical Report 149300, June 2010; and P. Felzenszwalb and D. Huttenlocher, "Efficient graph-based image segmentation", International Journal of Computer Vision. 2004).

Next, the object area inputting unit 200 inputs, through the inputting device 3, the object area in the registration image acquired by the image acquiring unit 100 (S203). In the present embodiment, a user operates the inputting device 3 to input the object area while watching the image data output by the outputting device 4 and the area division result by the area dividing unit 110. In any case, the detailed operation will be described later.

Next, the candidate area acquiring unit 130 converts the object area acquired by the object area inputting unit 200 into data having a predetermined data format, and stores the converted data (S204). More specifically, a circumscribed rectangle surrounding the object area input in S203 is set, the data in the set circumscribed rectangle is converted to have a predetermined size (e.g., 100×100 pixels), and then the obtained data is stored as the binary mask data.

Next, the image feature extracting unit 140 extracts the image feature from the object area acquired by the candidate area acquiring unit 130, and stores the extracted image feature in the storing device 2 (S205). In the present embodiment, the image feature extracting unit 140 extracts an HOG (Histograms of Oriented Gradients) feature quantity (see Dalal and Triggs, "Histograms of Oriented Gradients for Human Detection", Proceedings of the IEEE Conference on Computer Vision and Pattern Recognition, 2005) as the image feature. In any case, the detail thereof will be described later.

Next, the shape feature extracting unit 150 extracts the shape feature of the object area acquired by the candidate area acquiring unit 130, and stores the extracted shape feature in the storing device 2 (S206). In the present embodiment, the binary mask data acquired by the candidate area acquiring unit 130, which is arranged one-dimensionally, is extracted as the feature vector representing the shape feature. Also, it may be possible to extract a binary image moment as the shape feature.

Subsequently, it is discriminated whether or not the processes in S201 to S206 are performed on all the frames of the moving image (S207). If it is discriminated that a frame which is not yet processed still exists, the procedure is returned to S201 to repeat the above processes.

On the other hand, if it is discriminated in S207 that all the frames of the moving image were processed, the object information learning unit 160 learns the object information by using the image feature extracted by the image feature extracting unit 140 and the shape feature extracted by the shape feature extracting unit 150 (S208). More specifically, the object information learning unit 160 reads the image feature and the shape feature from the storing device 2, and learns the object information for each of the image feature and the shape feature based on SVDD (Support Vector Data Description), (see D. Tax and R. Duin, "Support Vector Data Description", Machine Learning, 54(1):45-66, 2004). The SVDD is the method of performing learning by representing, from a plurality of samples of discrimination targets, a class to which a target belongs with use of a hypersphere. In any case, the detail thereof will be described later. Then, the object information learning unit 160 stores the learning result in the object information storing unit 170 (S209).

(Detail of Object Area Inputting Process)

Figure 3:
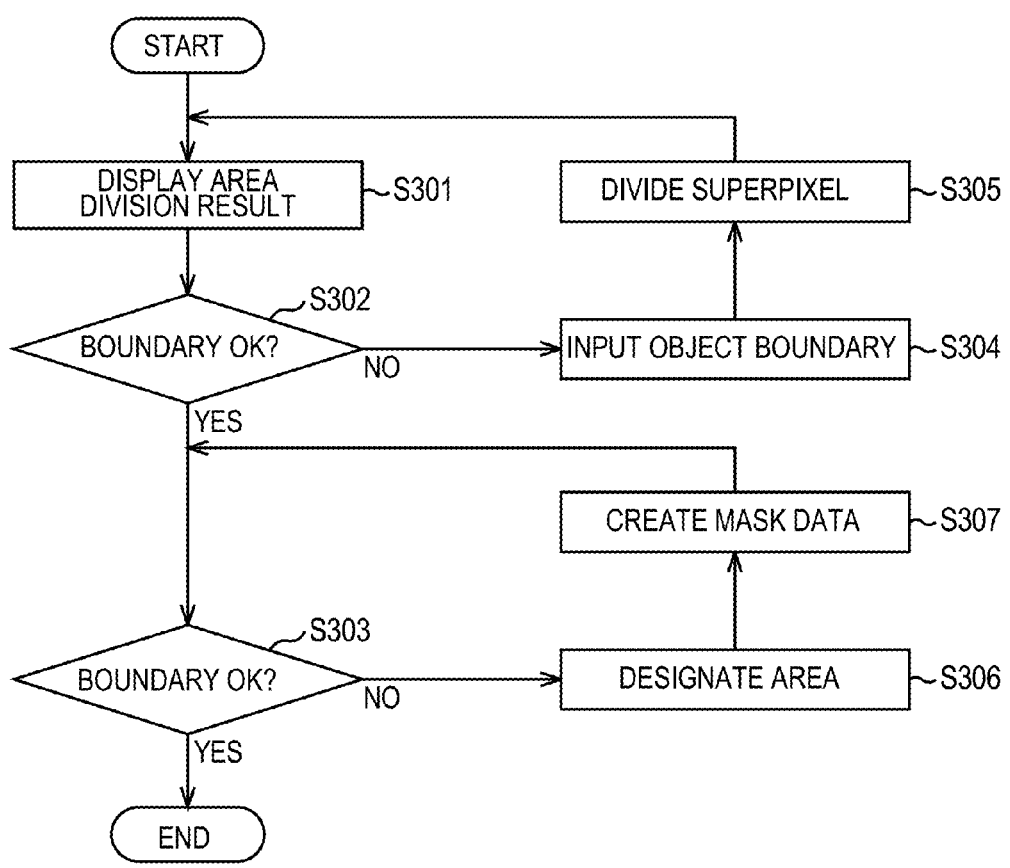
FIG. 3 is a flow chart indicating an example of a detailed processing procedure for inputting an object area.

FIG. 3 is a flow chart indicating an example of the detailed processing procedure that the object area inputting unit 200 inputs the object area in S203.

Figure 4A:
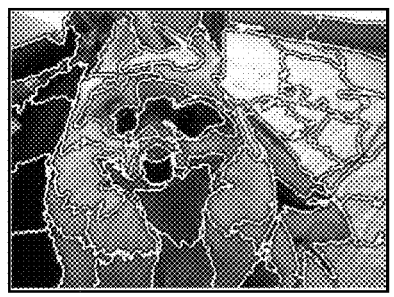
FIGS. 4A and 4B are diagrams respectively illustrating examples of images on which boundaries being area division results are superposed.

Initially, the object area inputting unit 200 displays, on the outputting device 4, an image in which the boundaries being the area division result are superposed on the image data of the object being the recognition target (S301). FIG. 4A illustrates an example the displayed image.

Next, the object area inputting unit 200 displays, on the outputting device 4, a screen for causing a user to confirm the displayed object boundary, and thus discriminates whether or not an instruction "YES" (i.e., BOUNDARY OK) is input from the inputting device 3 by the user's operation (S302). If it is discriminated that an instruction "NO" is input by the user's operation, the object boundary instructed by the subsequent user's operation is input (S304). In this process, the user inputs the object boundary with use of the inputting device while watching the displayed image. Then, the area dividing unit 110 reflects, on the area division result, the object boundary input by the user (S305). In this process, in the process result by the area dividing unit 110, the superpixel including the boundary designated by the user is divided along the relevant boundary. After the boundary is input, the procedure is returned to S301, and the process is repeated until a desired object boundary can be obtained.

On the other hand, if it is discriminated in S302 that the instruction "YES" is input, the screen for causing the user to confirm the object boundary is displayed on the outputting device 4, and it is discriminated whether or not the instruction "YES" (i.e., BOUNDARY OK) is input from the inputting device 3 by the user's operation (S303). Here, the displayed image discriminably includes the object area and the background area, and, in the initial state, all the superpixels constitute the background area. The user watches the displayed image, and thus inputs, by the inputting device 3, the result of the discrimination as to whether or not the object area is correct.

Figure 4B:

If it is discriminated in S303 that the instruction "YES" is input by the user's operation, the object area inputting process is ended. On the other hand, if it is discriminated that the instruction "NO" is input by the user's operation, the procedure is advanced to S306. Then, in the object area, the area which is displayed as the background area (i.e., the area to which correction is necessary) is designated by the inputting device 3 according to the user's operation (S306). Then, the mask data representing the object area after correction is created according to the input in S306 (S307). Here, the mask data is displayed on the outputting device 4 together with the image data and the object boundary. FIG. 4B illustrates an example of the displayed image including the mask data. Subsequently, the procedure is returned to S303, and the discrimination is repeated until it is discriminated that the object area is input correctly.

(Detail of Image Feature Extracting Process)

FIG. 5 is a flow chart indicating an example of the detailed processing procedure for extracting the image feature by the image feature extracting unit 140 in S205 of FIG. 2.

Figure 6:
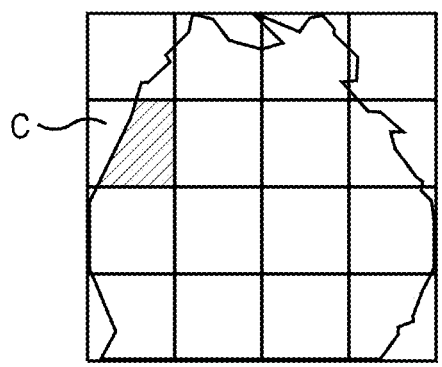
FIG. 6 is a diagram illustrating an example of a plurality of cells obtained by dividing a circumscribed rectangle.

Initially, the image feature extracting unit 140 divides (or segments) the circumscribed rectangle set by the candidate area acquiring unit 130 (S501). For example, as illustrated in FIG. 6, the circumscribed rectangle is divided into the vertical 4×horizontal 4 cells, and the feature extracting process is performed hereafter to each of the divided cells.

Next, the image feature extracting unit 140 selects one pixel in the cell (S502), and discriminates whether or not the selected pixel is the pixel within the object area by referring to the mask data representing the object area acquired by the candidate area acquiring unit 130 (S503). If it is discriminated that the selected pixel is not the pixel within the object area, the procedure is returned to S502 to select a next pixel. On the other hand, if it is discriminated that the selected pixel is the pixel within the object area, the feature extracting process is performed in S504 to S505.

First, the image feature extracting unit 140 calculates horizontal and vertical luminance gradients for the selected pixel, and obtains gradient intensity and direction from the calculated luminance gradients (S504). Further, the image feature extracting unit 140 obtains a class of a histogram from the obtained gradient direction, and adds the gradient intensity to the bin corresponding to the obtained class (S505).

Next, the image feature extracting unit 140 discriminates whether or not all the pixels in all the cells are selected (S506). If it is discriminated that the pixel not yet selected exists, the procedure is returned to S502 to repeat the above process. Thus, if all the pixels in the cells are processed, the histogram feature for the image data of the object area in the cell can be obtained. At this time, as to, e.g., a cell C illustrated in FIG. 6, the image feature is extracted only from the pixels in the object area shown as the hatched-line portion.

Then, if it is discriminated in S506 that all the pixels in all the cells have been selected, that is, if the histogram features are obtained for all the cells, then the extracted histogram features of the respective cells are combined as the image feature of the object area (S507). Incidentally, the HOG feature quantity is extracted in the present embodiment. However, it may be also possible to extract the image feature by another method. Besides, when extracting the feature quantity from the pixels in the object area by referring to the mask data, for example, it may be possible to extract, in addition to the HOG feature quantity, a SIFT (Scale-Invariant Feature Transform) feature quantity (see D. G. Lowe. Distinctive image features from scale-invariant key points. Proc. of Int. Journal of Computer Vision, 2004), a color histogram or the like.

(Detail of Object Information Learning Process)

Hereinafter, in the learning process of the object information to be performed in S208 of FIG. 2, the process of learning the image feature will be described. The plurality of feature quantities extracted by the image feature extracting unit 140 is the set of training samples in the SVDD. Here, the training sample is given as $x_i$ (i=1, . . . , N: N is the number of samples). In the SVDD, the quadratic programming problem shown by the following expression (1) is solved, and a super sphere of the minimum radius including the training samples is obtained.

$$\min R^2 + c \sum_{i=0}^{N} \zeta_i \quad (1)$$
$$\text{s.t.} \ \|\Phi(x_i) - a\|^2 \leq R^2 + \zeta_i$$

Here, R is the radium of the super sphere, a is the center of the super sphere, $\xi_i$ is the slack variable, $\varphi$ is the non-linear mapping to the high-dimensional feature space, and C is the parameter for controlling the trade-off between the volume of the super sphere and the number of samples outside the super sphere. If the Lagrange multiplier $\alpha_i \geq 0$ is introduced, the expression (1) can be represented as the problem for solving the following expression (2).

$$\min_{\alpha} \sum_{i,j} \alpha_i \alpha_j K(x_i, x_j) - \sum_i \alpha_i K(x_i, x_i) \quad (2)$$
$$\text{s.t.} \ 0 \leq \alpha_i \leq C, \ \sum_i \alpha_i = 1$$

Here, $K(x_1, x_j) = (\varphi(x_i), \varphi(x_j))$ is the kernel function. In the coefficients $\alpha_i$ which satisfy the expression (2), the sphere can be expressed by the samples corresponding to the non-zero coefficient, and, in the SVDD, the relevant training samples are extracted as the support vector (i.e., boundary sample). At this time, if it is assumed that the distance from the center of the super sphere of the input sample z is given as $R_z$, the following expression (3) holds.

$$R_z^2 = K(z, z) - 2 \sum_{i=1}^{N_{SV}} \alpha_i K(x_i, z) + \sum_{i=1}^{N_{SV}} \sum_{j=1}^{N_{SV}} \alpha_i \alpha_j (x_i, x_j) \quad (3)$$

Here, $N_{SV}$ is the number of the extracted support vectors, and $\Sigma$ is the sum total for the extracted support vectors.

Next, the concrete processing procedure for learning the image feature will be described. Initially, the object information learning unit 160 calculates HIK (Histogram Intersection Kernel) from the plurality of histogram features extracted by the image feature extracting unit 140. Here, the HIK is obtained by the following expression (4).

$$K(x_i, x_j) = \sum_{l=1}^{d} \min(x_{il}, x_{jl}) \quad (4)$$

Here, $x_{i1}$ and $x_{j1}$ are respectively the l-th features of the feature quantities $x_i$ and $x_j$, d is the dimension of the feature quantity, and min( ) is the function for returning the smaller one of the two values. In the present embodiment, the HIK is used as the kernel function of the SVDD.

Next, the object information learning unit 160 discriminates the boundary sample by the SVDD from the values of the HIK of the obtained feature quantities. That is, the training sample corresponding to the non-zero coefficient in the coefficients $\alpha_i$ satisfying the above expression (2) is discriminated as the support vector (boundary sample). In the object information storing process in S209 of FIG. 2, the object information learning unit 160 stores, as the object information, the training sample $x_i$ discriminated as the boundary sample and the coefficient $\alpha_i$ in the object information storing unit 170. Incidentally, it is assumed that, when learning the shape feature, the shape feature is allocated to the training sample $x_i$.

Next, a flow of the process to be performed when, after the object registered in the input image was recognized, the object area is cut out from the input image will be described with reference to FIG. 7.

That is, FIG. 7 is the flow chart indicating an example of the checking procedure according to the present embodiment.

Initially, the image acquiring unit 100 acquires, as the input image, the image obtained by imaging the recognition target (S701). Then, the area dividing unit 110 divides (or segments) the input image acquired by the image acquiring unit 100 into a plurality of superpixels (i.e., small areas) composed of adjacent similar pixels (S702). Here, it should be noted that the processes in S701 and S702 respectively conform to the processes in S201 and S202 of FIG. 2 being the process to be performed in the registration.

Next, the area integrating unit 120 integrates the plurality of adjacent superpixels obtained by the area dividing unit 110 (S703). Hereinafter, the process to be performed by the area integrating unit 120 will be described with reference to FIGS. 8A and 8B.

Figure 8A:
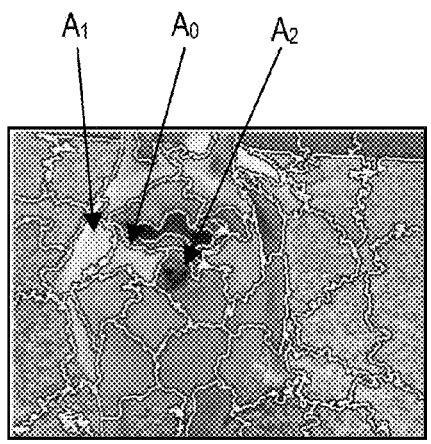
FIGS. 8A and 8B are diagrams illustrating an example of a result obtained by dividing an input image.
Figure 8B:
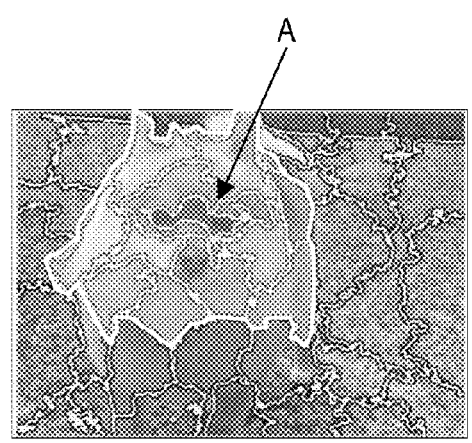

FIG. 8A illustrates an example of the result obtained by dividing the input image with the area dividing unit 110. The area integrating unit 120 integrates, e.g., an area $A_0$ and an adjacent area $A_1$ of FIG. 8A to make one area $A_{01}$. Besides, for example, it is also possible to integrate the area $A_0$ and an area $A_2$ to make one area $A_{02}$, and integrate the integrated area $A_{01}$ and the area $A_2$ to make one area $A_{012}$. In other words, the area integrating unit integrates the areas based on various combinations while limiting the number of the superpixels to be integrated and the size of the integrated area. It should be noted that the integrated area includes the area, as in FIG. 8B, corresponding to the object area designated as in FIG. 4B at the time of the registration.

Next, the candidate area acquiring unit 130 acquires one area acting as the candidate of the object area from the superpixel divided by the area dividing unit 110 or the area integrated by the area integrating unit 120 (S704). Here, it should be noted that the process in S704 conforms to the process in S204 of FIG. 2 being the process to be performed in the registration. Then, the image feature extracting unit 140 extracts the image feature from the object area acquired by the candidate area acquiring unit 130 (S705), and the shape feature extracting unit 150 extracts the shape feature of the object area acquired by the candidate area acquiring unit 130 (S706). Here, it should be noted that the processes in S705 and S706 respectively conform to the processes in S205 and S206 of FIG. 2 being the process to be performed in the registration.

Next, the object information checking unit 180 checks the image feature extracted by the image feature extracting unit 140 and the shape feature extracted by the shape feature extracting unit 150, against the object information stored in the object information storing unit 170 (S707). Here, the extracted image feature is given as z, and the left member value $R_z^2$ is obtained by the above expression (3) using the object information $x_i$ and $\alpha_i$ obtained from the image feature of the registration image stored in the object information storing unit 170. Likewise, the left member value $R_z^2$ is obtained by the above expression (3) from the extracted shape feature and the object information obtained from the shape feature of the registration image stored in the object information storing unit 170. Then, the obtained two values are set respectively to the check degree $S_g$ of the image feature and the check degree $S_s$ of the shape feature, and the check degree S against the registration object is obtained by the following expression (5).

$$S = w_g S_g + w_s S_s \qquad (5)$$

Here, $w_g$ and $w_s$ are respectively the weighting coefficients for obtaining an appropriate checking result.

Next, it is discriminated whether or not the checking is ended for all the candidate areas (S708). If it is discriminated that the checking is not ended for all the candidate areas, the procedure is returned to S704 to repeat the above process. On the other hand, if it is discriminated that the checking is ended for all the candidate areas, the result integrating and outputting unit 190 integrates the plurality of results checked by the object information checking unit 180, and outputs the integrated result (S709). More specifically, in the check degrees S of the respective candidate areas obtained in S707, the candidate area corresponding to the highest check degree which is higher than a predetermined value is obtained. Then, the object area is cut out from the input image by using the mask data of the obtained candidate area, and the cut-out object area is output.

As described above, according to the present embodiment, the image feature extracted from the object area of the registration image and the image feature extracted from the candidate area of the input image are checked against (or collated with) each other. At this time, the plurality of checks is performed by using the superpixels obtained by dividing the input image or the areas obtained by integrating the adjacent superpixels as the candidate area. Thus, it is possible to eliminate the influence of the background image in the checking when the boundary of the candidate area of the input image coincides with the object boundary, and it is thus possible to accurately detect the object. Further, it is possible to cut out the object area in the detection by using the mask data of the candidate area. Furthermore, by extracting the shape feature from the mask data, it is possible to perform the recognition with a high degree of accuracy because it is possible to perform the checking using not only the image feature but also the shape feature. Besides, in the present embodiment, since the object information is learned by inputting the plurality of image data and the object area from the moving image, it is possible to recognize the object with a high degree of accuracy.

OTHER EMBODIMENTS

In the above embodiment, the HIK is used as the kernel function when learning the object information. However, another kernel function such as a Gaussian kernel function or a linear kernel function may be used. When using the HIK or the liner kernel function, it may be possible to store a static obtained by integrating the training samples instead of the training sample directly discriminated as the boundary sample. In this case, the calculation (i.e., the second term of the right member of the expression (3)) of the kernel function for each training sample in the object information checking process can be replaced by calculation using the static, and it is thus possible to reduce the process quantity.

Further, in the above embodiment, the SVDD which is one of the one-class learning is used when learning the object information. However, it may be possible to use a learning method of performing two-class discrimination such as SVM (Support Vector Machine). In this case, the learning is performed by extracting the image feature and the shape feature also from the area other than the area input as the object area at the time of registration. Besides, it may be possible to perform additional learning of the object information by using the result of the checking process for the input image. For example, if the check degree of the image feature obtained by the object information checking unit 180 is equal to or higher than a predetermined value, the relevant image feature is added to the training sample of the SVDD, and re-learning is performed. Likewise, if the check degree of the shape feature is higher than a predetermined value, the relevant shape feature is added to the training sample of the SVDD, and re-learning is performed.

According to the embodiments as described above, it is possible to accurately detect the registration object from the input image and cut out the object area.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240175, filed Nov. 20, 2013, which is hereby incorporated by reference herein in its entirety.

What is claimed is:

1. An image processing apparatus comprising:
a memory for storing a program;
a processor which executes the program stored in the memory to:
input an object area of an image for learning; and
learn information concerning a feature quantity of the object area using the feature quantity extracted from the input object area of the image for learning, wherein the learning learns the image feature of the object area as a combination of the image features for each partial area obtained by dividing a circumscribed rectangle of the object area into a predetermined number of partial areas, and generates the image feature of each partial area by using information of pixels included in the object area in the partial area;
acquire an image including an object;
divide the acquired image into a plurality of superpixels based on similarity of pixel values of adjacent pixels;
generate a plurality of candidate areas for an area of the object by combining respective combinations of two or more superpixels in the plurality of superpixels, wherein the candidate areas correspond to different combinations of the superpixels;
extract a feature quantity from each of the plurality of candidate areas;
check the feature quantity extracted from each candidate area, against registered information concerning the feature quantity of the object area; and
output the area of the object in the acquired image, based on a checked result for each candidate area by the checking.

2. The image processing apparatus according to claim 1, wherein the information concerning the feature quantity of object area includes the feature quantity or a static of the feature quantities.

3. The image processing apparatus according to claim 1, wherein
the image acquiring acquires a plurality of frame images from a moving image, and
the learning is performed using the plurality of frame images.

4. The image processing apparatus according to claim 1, wherein the processor is further configured to display a result acquired by dividing the acquired image for learning into the plurality of superpixels, wherein
a combination of the areas selected by a user from the plurality of displayed superpixels are input as the object area.

5. The image processing apparatus according to claim 4, wherein the processor is further configured to add, in boundaries of the object area in the image for learning, a boundary not included in boundaries of the plurality of displayed superpixels, in response to an instruction of the user.

6. The image processing apparatus according to claim 1, wherein
the learning learns an image feature and a shape feature of the object area as the information concerning the feature quantity of the object area,
the extracting extracts the feature quantity including an image feature and a shape feature of the candidate area, and the checking checks the image feature of the candidate area against the image feature of the object area, checks the shape feature of the candidate area against the shape feature of the object area, and integrates respective checking results.

7. An image processing method comprising:
inputting an object area of an image for learning; and
learning information concerning a feature quantity of the object area using the feature quantity extracted from the input object area of the image for learning, wherein the learning learns the image feature of the object area as a combination of the image features for each partial area obtained by dividing a circumscribed rectangle of the object area into a predetermined number of partial areas, and generates the image feature of each partial area by using information of pixels included in the object area in the partial area;
acquiring an image including an object;
dividing the acquired image into a plurality of superpixels based on similarity of pixel values of adjacent pixels;
generating a plurality of candidate areas for an area of the object by combining respective combinations of two or more superpixels in the plurality of superpixels, wherein the candidate areas correspond to different combinations of the superpixels;
extracting a feature quantity from each of the plurality of acquired candidate areas;
checking the feature quantity extracted from each candidate area against registered information concerning the feature quantity of the object area; and
outputting the area of the object in the acquired image based on a checked result for each candidate area.

8. A non-transitory computer-readable storage medium which stores a program for causing a computer to perform respective constituent steps of the image processing method, the method comprising:
inputting an object area of an image for learning; and
learning information concerning a feature quantity of the object area using the feature quantity extracted from the input object area of the image for learning, wherein the learning learns the image feature of the object area as a combination of the image features for each partial area obtained by dividing a circumscribed rectangle of the object area into a predetermined number of partial areas, and generates the image feature of each partial area by using information of pixels included in the object area in the partial area;
acquiring an image including an object;
dividing the acquired image into a plurality of superpixels based on similarity of pixel values of adjacent pixels;
generating a plurality of candidate areas for an area of the object by combining respective combinations of two or more superpixels in the plurality of superpixels, wherein the candidate areas correspond to different combinations of the superpixels;
extracting a feature quantity from each of the plurality of acquired candidate areas;
checking the feature quantity extracted from each candidate area against registered information concerning the feature quantity of the object area; and
outputting the area of the object in the acquired image based on a checked result for each candidate area.

* * * * *